United States Patent
Jamzadeh

(10) Patent No.: US 11,488,218 B2
(45) Date of Patent: *Nov. 1, 2022

(54) USING PLAIN TEXT TO LIST AN ITEM ON A PUBLICATION SYSTEM

(71) Applicant: eBay Inc., San Jose, CA (US)

(72) Inventor: Feraydoon Shahjahan Jamzadeh, Los Altos, CA (US)

(73) Assignee: eBay Inc., San Jose, CA (US)

( * ) Notice: Subject to any disclaimer, the term of this patent is extended or adjusted under 35 U.S.C. 154(b) by 189 days.

This patent is subject to a terminal disclaimer.

(21) Appl. No.: 16/569,209

(22) Filed: Sep. 12, 2019

(65) Prior Publication Data

US 2020/0082446 A1 Mar. 12, 2020

Related U.S. Application Data

(63) Continuation of application No. 13/841,998, filed on Mar. 15, 2013, now Pat. No. 10,438,254.

(51) Int. Cl.
G06Q 30/06 (2012.01)

(52) U.S. Cl.
CPC ..... *G06Q 30/0601* (2013.01); *G06Q 30/0609* (2013.01)

(58) Field of Classification Search
CPC ......... G06Q 30/06–0645; G06Q 30/08; G06Q 50/01
See application file for complete search history.

(56) References Cited

U.S. PATENT DOCUMENTS

| | | | |
|---|---|---|---|
| 5,706,497 A | 1/1998 | Takahashi et al. | |
| 5,920,859 A | 7/1999 | Li | |
| 6,012,053 A | 1/2000 | Pant et al. | |
| 6,078,866 A | 6/2000 | Buck et al. | |

(Continued)

FOREIGN PATENT DOCUMENTS

| | | |
|---|---|---|
| CN | 1894711 B | 5/2016 |
| WO | 01/93067 A1 | 12/2001 |

(Continued)

OTHER PUBLICATIONS

Advisory Action received for U.S. Appl. No. 13/841,998, dated Oct. 25, 2018, 5 pages.

(Continued)

*Primary Examiner* — Adam L Levine
(74) *Attorney, Agent, or Firm* — Holland & Hart LLP

(57) ABSTRACT

Listing an item on a publication system involves sending the publication system an email or other communication that includes title, description and a picture of the item. The email may be in plain text, with the publication system using the email for listing the item with minimal complexity for the user. The publication system may receive the email, parse the email to extract title, description, price, classification, attributes and perhaps other information with respect to the item, and compose a view item page ("VIP") for the item listing. The extracting may also be by decoding a product identifier in the communication. The VIP may be privately viewable and editable by the user. The user may then modify or otherwise confirm the VIP. When the user confirms the VIP, the VIP goes live as the listing on the publication system.

20 Claims, 12 Drawing Sheets

(56) References Cited

U.S. PATENT DOCUMENTS

| | | | |
|---|---|---|---|
| 6,253,188 | B1 | 6/2001 | Witek et al. |
| 6,269,361 | B1 | 7/2001 | Davis et al. |
| 6,496,818 | B1 | 12/2002 | Ponte |
| 6,510,417 | B1 | 1/2003 | Woods et al. |
| 6,535,888 | B1 | 3/2003 | Vijayan et al. |
| 6,549,904 | B1 | 4/2003 | Ortega et al. |
| 6,556,989 | B1 | 4/2003 | Naimark et al. |
| 6,671,674 | B1 | 12/2003 | Anderson et al. |
| 6,701,313 | B1 | 3/2004 | Smith |
| 6,751,600 | B1 | 6/2004 | Wolin |
| 6,751,621 | B1 | 6/2004 | Calistri-Yeh et al. |
| 6,785,671 | B1 | 8/2004 | Bailey et al. |
| 6,829,606 | B2 | 12/2004 | Ripley |
| 6,850,940 | B2 | 2/2005 | Wesinger et al. |
| 6,892,193 | B2 | 5/2005 | Bolle et al. |
| 7,039,860 | B1 | 5/2006 | Gautestad |
| 7,043,483 | B2 | 5/2006 | Colace et al. |
| 7,062,453 | B1 | 6/2006 | Clarke |
| 7,152,065 | B2 | 12/2006 | Behrens et al. |
| 7,225,182 | B2 | 5/2007 | Paine et al. |
| 7,472,077 | B2 | 12/2008 | Roseman et al. |
| 7,509,315 | B1 | 3/2009 | Alpert et al. |
| 7,590,695 | B2 * | 9/2009 | Landsman ............... H04L 51/12 709/204 |
| 7,680,891 | B1 * | 3/2010 | Pongsajapan ........ G06Q 10/107 709/206 |
| 7,870,031 | B2 | 1/2011 | Bolivar |
| 8,353,028 | B2 | 1/2013 | Lalonde et al. |
| 8,473,360 | B2 | 6/2013 | Bolivar |
| 9,047,635 | B2 | 6/2015 | Hamilton et al. |
| 9,275,215 | B2 * | 3/2016 | Bailey .................... G06Q 30/02 |
| 10,438,254 | B2 | 10/2019 | Jamzadeh |
| 10,997,284 | B2 * | 5/2021 | Bailey ................... H04L 63/083 |
| 2001/0042064 | A1 | 11/2001 | Davis et al. |
| 2001/0044758 | A1 | 11/2001 | Talib et al. |
| 2002/0082977 | A1 | 6/2002 | Hammond et al. |
| 2002/0120506 | A1 | 8/2002 | Hagen |
| 2002/0120619 | A1 | 8/2002 | Marso et al. |
| 2002/0169760 | A1 | 11/2002 | Cheung et al. |
| 2003/0050914 | A1 | 3/2003 | Bachman et al. |
| 2003/0115116 | A1 | 6/2003 | Crampton |
| 2003/0172082 | A1 | 9/2003 | Benoit et al. |
| 2003/0172357 | A1 | 9/2003 | Kao et al. |
| 2003/0233350 | A1 | 12/2003 | Dedhia et al. |
| 2004/0015397 | A1 | 1/2004 | Barry et al. |
| 2004/0068413 | A1 | 4/2004 | Musgrove et al. |
| 2004/0139059 | A1 | 7/2004 | Conroy et al. |
| 2004/0204958 | A1 | 10/2004 | Perkins et al. |
| 2004/0221235 | A1 | 11/2004 | Marchisio et al. |
| 2004/0249794 | A1 | 12/2004 | Nelson et al. |
| 2004/0260604 | A1 | 12/2004 | Bedingfield |
| 2004/0260621 | A1 | 12/2004 | Foster et al. |
| 2005/0189415 | A1 | 9/2005 | Fano et al. |
| 2005/0273378 | A1 | 12/2005 | Macdonald-korth et al. |
| 2007/0150365 | A1 | 6/2007 | Bolivar |
| 2011/0071917 | A1 | 3/2011 | Bolivar |
| 2011/0288962 | A1 * | 11/2011 | Rankin, Jr. ............ G06Q 30/02 705/27.1 |
| 2013/0282528 | A1 | 10/2013 | Bolivar |
| 2014/0279139 | A1 | 9/2014 | Jamzadeh |
| 2014/0280498 | A1 * | 9/2014 | Frankel ............... H04L 65/4084 709/203 |
| 2015/0026246 | A1 | 1/2015 | Taylor |
| 2015/0127502 | A1 | 5/2015 | Knepfle et al. |
| 2020/0160433 | A1 | 5/2020 | Nelson et al. |

FOREIGN PATENT DOCUMENTS

| | | |
|---|---|---|
| WO | 2002/054292 A2 | 7/2002 |
| WO | 2004/111772 A2 | 12/2004 |
| WO | 2004/111774 A2 | 12/2004 |
| WO | 2007/078560 A2 | 7/2007 |
| WO | 2007/078560 A3 | 10/2007 |

OTHER PUBLICATIONS

Applicant Initiated Interview Summary received for U.S. Appl. No. 13/841,998, dated Apr. 27, 2017, 1 page.
Applicant Initiated Interview Summary received for U.S. Appl. No. 13/841,998, dated Apr. 28, 2017, 3 pages.
Applicant Initiated interview Summary received for U.S. Appl. No. 13/841,998, dated Sep. 20, 2017, 3 pages.
Final Office Action received for U.S. Appl. No. 13/841,998, dated Jul. 27, 2017, 18 pages.
Final Office Action received for U.S. Appl. No. 13/841,998, dated May 19, 2016, 18 pages.
Final Office Action received for U.S. Appl. No. 13/841,998, dated Aug. 16, 2018, 16 pages.
Non-Final Office Action received for U.S. Appl. No. 13/841,998, dated Jan. 12, 2017, 22 pages.
Non-Final Office Action received for U.S. Appl. No. 13/841,998, dated Jan. 24, 2018, 21 pages.
Non-Final Office Action received for U.S. Appl. No. 13/841,998, dated Jun. 26, 2015, 13 pages.
Notice of Allowance received for U.S. Appl. No. 13/841,998, dated May 29, 2019, 17 pages.
Response to Non-Final Office Action filed on Apr. 12, 2017, for U.S. Appl. No. 13/841,998, dated Jan. 12, 2017, 11 pages.
Response to Final Office Action filed on Oct. 16, 2018, for U.S. Appl. No. 13/841,998, dated Aug. 16, 2018, 10 pages.
Response to Final Office Action filed on Oct. 30, 2018, for U.S. Appl. No. 13/841,998, dated Aug. 16, 2018, 9 pages.
Response to Final Office Action filed on Sep. 14, 2017, for U.S. Appl. No. 13/841,998, dated Jul. 27, 2017, 11 pages.
Response to Final Office Action filed on Sep. 19, 2016, for U.S. Appl. No. 13/841,998, dated May 19, 2016, 14 pages.
Response to Non-Final Office Action filed on Dec. 21, 2015, for U.S. Appl. No. 13/841,998, dated Jun. 26, 2015, 17 pages.
Response to Non-Final Office Action filed on May 14, 2018, for U.S. Appl. No. 13/841,998, dated Jan. 24, 2018, 15 pages.
Khoo et al., "Emerging Topic Tracking System", Proceedings Third International Workshop on Advanced Issues of E-Commerce and Web-Based Information Systems, Jun. 2001, 2 pages.
Mok, "An Intelligent Agent For Web Advertisements", Proceedings of the Third International Symposium on Cooperative Database Systems for Advanced Applications, Apr. 23-24, 2001, 2 pages.
Schafer et al., "E-Commerce Recommendation Applications," Data Mining and Knowledge Discovery, 5 (1-2), Jan. 2001, 39 pages.
U.S. Appl. No. 13/841,998, filed Mar. 15, 2013, Issued.
Non-Final Office Action received for U.S. Appl. No. 11/316,183, dated Mar. 26, 2010, 16 pages.
Notice of Allowance received for U.S. Appl. No. 11/316,183, dated Sep. 7, 2010, 6 pages.
Response to Non-Final Office Action filed on Jun. 28, 2010, for U.S. Appl. No. 11/316,183, dated Mar. 26, 2010, 19 pages.
Applicant Initiated Interview Summary received for U.S. Appl. No. 12/884,776, dated Nov. 13, 2012, 3 pages.
Non-Final Office Action received for U.S. Appl. No. 12/884,776, dated Jul. 6, 2012, 17 pages.
Notice of Allowance received for U.S. Appl. No. 12/884,776, dated Feb. 27, 2013, 9 pages.
Response to Non-Final Office Action filed on Nov. 6, 2012 for U.S. Appl. No. 12/884,776, dated Jul. 6, 2012, 13 pages.
Final Office Action received for U.S. Appl. No. 13/924,354, dated Mar. 23, 2017, 24 pages.
Final Office Action Received for U.S. Appl. No. 13/924,354 dated Apr. 26, 2018, 8 pages.
Non Final Office Action received for U.S. Appl. No. 13/924,354, dated Sep. 6, 2017, 23 pages.
Non-Final Office Action received for U.S. Appl. No. 13/924,354, dated Aug. 11, 2016, 21 pages.
Preliminary Amendment for U.S. Appl. No. 13/924,354, filed Dec. 1, 2014, 8 pages.
Response to Final Office Action filed on Aug. 16, 2017 for U.S. Appl. No. 13/924,354, dated Mar. 23, 2017, 17 pages.
Response to Non-Final Office Action filed on Feb. 13, 2017 for U.S. Appl. No. 13/924,354, dated Aug. 11, 2016, 13 pages.

(56) References Cited

OTHER PUBLICATIONS

Response to Non-Final Office Action filed on Mar. 2, 2018 for U.S. Appl. No. 13/924,354, dated Sep. 6, 2017, 15 pages.
Allendorfer et al., "Fundamentals of Freshman Mathematics", Exponential and Logarithmic Functions, Chapter 11, pp. 264-272.
International Preliminary Report on Patentability received for PCT Application No. PCT/US2006/046697, dated Jun. 24, 2008, 6 pages.
International Search Report for PCT Application No. PCT/US2006/046697, dated Aug. 15, 2007, 1 page.
International Written Opinion for PCT Application No. PCT/US2006/046697, dated Aug. 15, 2007, 5 pages.
Swithinbank, "Planning and Managing the Deployment of Websphere Commerce", IBM Redbook, IBM International Technical Support Organization, pp. 430, Jun. 2008, 1 page.
Tagliacozzo et al., "Written Representation Of Topics And The Production Of Query Terms", Retrieved from the Internet URL: <https://onlinelibrary.wiley.com/doi/abs/10.1002/asi.4630220508>, Sep./Oct. 1971, 2 pages.
Hearst et al., "Modem Information Retrieval, Chapter 10: User Interfaces and Visualization", Modern Information Retrieval, ACM Press, 1999, pp. 257-323.
International Search Report and Written Opinion of the International Searching Authority, issued in connection with Int'l Appl. No. PCT/US2004/017533, dated Dec. 6, 2004 (8 pages).
Lenth, "Some Practical Guidelines for Effective Sample-Size Determination, Department of Statistics, University of Iowa.", Retrieved from the internet <U RL: https//stat.uiowa eduisitesistat.uiowa.edu/files/techrepitr303.pdf>, Mar. 1, 2001, 11 pages.
Supplementary European Search Report received for European Patent Application No. 04754199.0, dated Apr. 7, 2008, 2 pages.

\* cited by examiner

USING PLAIN TEXT TO LIST AN ITEM ON A PUBLICATION SYSTEM

CLAIM OF PRIORITY

This application is a continuation of U.S. patent application Ser. No. 13/841,998, filed Mar. 15, 2013, which is incorporated herein by reference in its entirety.

TECHNICAL FIELD

This application relates to a method and system to list an item on a publication system, such as listing an item for sale on an ecommerce system.

BACKGROUND

When listing items for publication on a publication system, such as listing an item for sale on an ecommerce system, It may be difficult or overly complex for people without significant computer skills to list a product using standard listing mechanisms.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
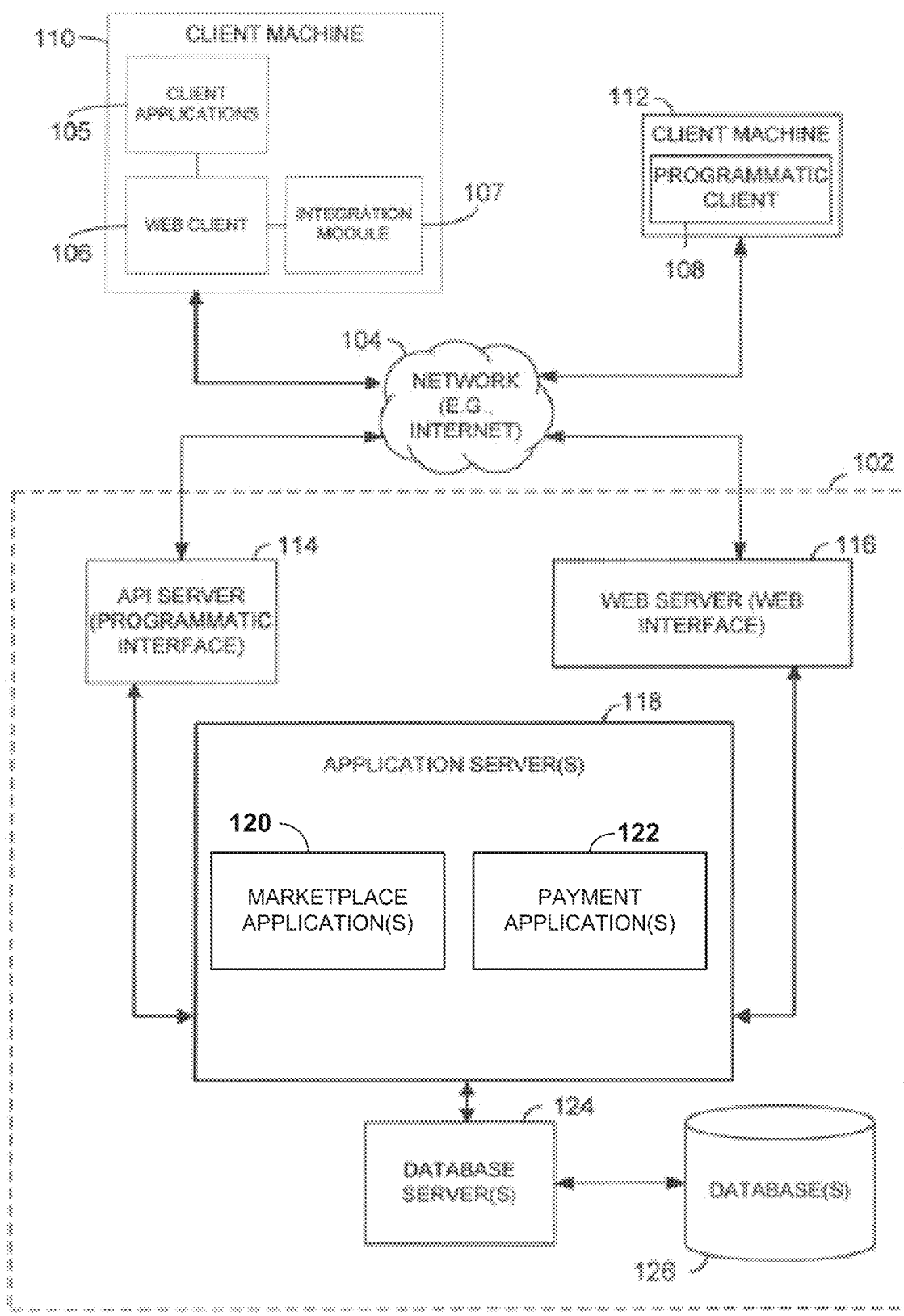
FIG. 1 is a network diagram depicting a client-server system, within which an example embodiment may be deployed.

The description that follows includes systems, methods, techniques, instruction sequences, and computing machine program products that embody illustrative example embodiments of the present disclosure. In the following description, for purposes of explanation, numerous specific details are set forth in order to provide an understanding of various example embodiments of the inventive subject matter. It will be evident, however, to those skilled in the art that embodiments of the disclosed subject matter may be practiced without these specific details. In general, well-known instruction instances, protocols, structures, and techniques have not been shown in detail.

As used herein, the term "or" may be construed in either an inclusive or exclusive sense. Additionally, although various example embodiments discussed below focus on a network-based publication system environment, the example embodiments are given merely for clarity in disclosure. As used herein, "publication system" may be any type of publication system. An ecommerce system is used herein as example embodiment of a publication system, although those of ordinary skill in the art will recognize that any type of publication system may be used. Thus, any type of electronic publication, electronic commerce, or electronic business system and method, including various system architectures, may employ various embodiments of the listing creation system and method described herein and may be considered as being within a scope of the example embodiments. Each of a variety of example embodiments may be discussed in detail below.

A system, method, and article of manufacture to provide an item listing in a publication system such as an ecommerce system are described. When listing items for publication on a publication system, such as in one example, listing an item for sale on an ecommerce system such as eBay, It may be difficult or overly complex for people without significant computer skills to list a product using standard listing mechanisms such as the "Turbo Lister 2" application developed by eBay Inc., of San Jose, Calif. This may be alleviated by an easier listing process that may involve merely sending the ecommerce system an email that includes sales information for an item, and has with a picture of the item attached. While the description below is described in terms of an email, those of ordinary skill in the art will recognize that texting or other types of communication that provides the type of information discussed may also be used. The email or other communication may be in the seller's words and in the seller's language, with the ecommerce using the email for listing the item with minimal complexity for the seller. The ecommerce system may receive the email, process the email and compose a view item page ("VIP") for the item listing. A view item page may be considered as a listing of the item that a prospective buyer will see when searching for an item to purchase. The seller may then confirm what the ecommerce has created as a view item page and when the seller confirms the view item page the listing goes live on the ecommerce system.

While the function described herein relates to listing an item on a publication system, the function could be any online function in addition to listing an item. For example, most service companies have phone menus for their different services, directing customers to press ONE to do XX, press TWO to do YY, etc. The embodiments described herein can be extended to allow customers of those companies to simply email or text asking the company to do XX or YY and those functions could be accomplished using the teachings herein.

FIG. 1 may be a network diagram depicting a network system 100, according to one example embodiment, having a client-server architecture configured for exchanging data over a network. For example, the network system 100 may include a network-based publisher 102 where clients may communicate and exchange data within the network system 100. The data may pertain to various functions (e.g., online item purchases) and aspects (e.g., managing content) associated with the network system 100 and its users. Although illustrated herein as a client-server architecture as an example, other embodiments may include other network architectures, such as a peer-to-peer or distributed network environment.

A data exchange platform, in an example form of a network-based publisher 102, may provide server-side functionality, via a network 104 (e.g., the Internet, wireless network, cellular network, or a Wide Area Network (WAN)) to one or more clients. The one or more clients may include users that utilize the network system 100 and more specifically, the network-based publisher 102, to exchange data over the network 104. These transactions may include transmitting, receiving (communicating) and processing data to, from, and regarding content and users of the network system 100. The data may include, but are not limited to, content and user data such as feedback data; user profiles; user attributes; product attributes; product and service reviews; product, service, manufacture, and vendor recommendations and identifiers; social network commentary, product and service listings associated with buyers and sellers; auction bids; and transaction data, among other things.

In various embodiments, the data exchanges within the network system 100 may be dependent upon user-selected functions available through one or more client or user interfaces (UIs). The UIs may be associated with a client device, such as a client device 110 using a web client 106. The web client 106 may be in communication with the network-based publisher 102 via a web server 116. The UIs may also be associated with a client device 112 using a programmatic client 108, such as a client application. It can be appreciated in various embodiments the client devices 110, 112 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things. The client devices 110 and 112 may comprise a mobile phone, desktop computer, laptop, or any other communication device that a user may use to access the network-based publisher 102.

Turning specifically to the network-based publisher 102, an application program interface (API) server 114 and a web server 116 are coupled to, and provide programmatic and web interfaces respectively to, one or more application servers 118. The application servers 118 host one or more publication application(s) of publication system 120 and one or more payment systems 122. The application server(s) 118 are, in turn, shown to be coupled to one or more database server(s) 124 that facilitate access to one or more database(s) 126.

In one example embodiment, the web server 116 and the API server 114 communicate and receive data pertaining to products, listings, transactions, social network commentary and feedback, among other things, via various user input tools. For example, the web server 116 may send and receive data to and from a toolbar or webpage on a browser application (e.g., web client 106) operating on a client device (e.g., client device 110). The API server 114 may send and receive data to and from an application (e.g., client application 108) running on another client device (e.g., client device 112).

The publication system 120 publishes content on a network (e.g., the Internet). As such, the publication system 120 provides a number of publication and marketplace functions and services to users that access the network-based publisher 102. For example, the publication application(s) of publication system 120 may provide a number of services and functions to users for listing goods and/or services for sale, facilitating transactions, and reviewing and providing feedback about transactions and associated users. Additionally, the publication application(s) of publication system 120 may track and store data and metadata relating to products, listings, transactions, and user interaction with the network-based publisher 102. The publication application(s) of publication system 120 may aggregate the tracked data and metadata to perform data mining to identify trends or patterns in the data. While the publication system 120 may be discussed in terms of a marketplace environment, it may be noted that the publication system 120 may be associated with a non-marketplace environment.

The payment system 122 provides a number of payment services and functions to users. The payment system 122 allows users to accumulate value (e.g., in a commercial currency, such as the U.S. dollar, or a proprietary currency, such as "points") in accounts, and then later to redeem the accumulated value for products (e.g., goods or services) that are made available via the publication system 120. The payment system 122 also facilitates payments from a payment mechanism (e.g., a bank account, PayPal account, or credit card) for purchases of items via the network-based marketplace. While the publication system 120 and the payment system 122 are shown in FIG. 1 to both form part of the network-based publisher 102, it will be appreciated that, in alternative embodiments, the payment system 122 may form part of a payment service that may be separate and distinct from the network-based publisher 102.

Application Server(s)

Figure 2:
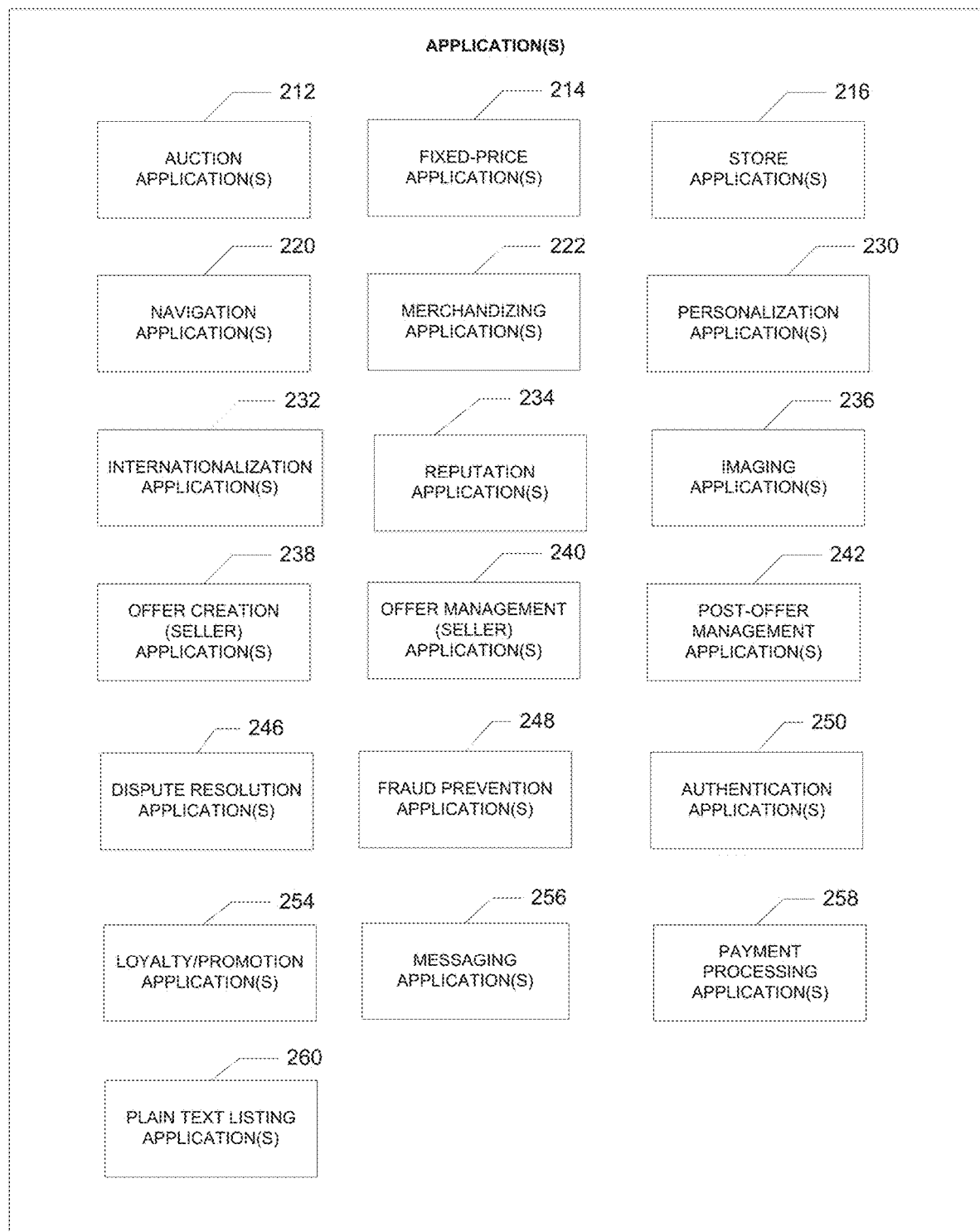
FIG. 2 is a block diagram of a system to provide an item listing, in accordance with an example embodiment.

FIG. 2 illustrates a block diagram showing applications of application server(s) that are part of the network system 100, in an example embodiment. In this embodiment, the publication system 120, and the payment system 120 may be hosted by the application server(s) 118 of the network system 100. The publication system 120 and the payment system 132 may be hosted on dedicated or shared server machines (not shown) that are communicatively coupled to enable communications between server machines. The applications themselves may be communicatively coupled (e.g., via appropriate interfaces) to each other and to various data sources, so as to allow information to be passed between the applications or so as to allow the applications to share and access common data.

The publication system 120 are shown to include at least one or more auction application(s) 212 which support auction-format listing and price setting mechanisms (e.g., English, Dutch, Vickrey, Chinese, Double, Reverse auctions etc.). The auction application(s) 212 may also provide a number of features in support of such auction-format listings, such as a reserve price feature whereby a seller may specify a reserve price in connection with a listing and a proxy-bidding feature whereby a bidder may invoke automated proxy bidding. The auction-format offer in any format may be published in any virtual or physical marketplace medium and may be considered the point of sale for the commerce transaction between a seller and a buyer (or two users).

One or more fixed-price application(s) 214 support fixed-price listing formats (e.g., the traditional classified advertisement-type listing or a catalogue listing) and buyout-type listings. Specifically, buyout-type listings (e.g., including the Buy-It-Now® (BIN) technology developed by eBay Inc., of San Jose, Calif.) may be offered in conjunction with auction-format listings, and allow a buyer to purchase goods or services, which are also being offered for sale via an auction, for a fixed-price that may be typically higher than the starting price of the auction.

The application(s) of the application server(s) 118 may include one or more store application(s) 216 that allow a seller to group listings within a "virtual" store. The virtual store may be branded and otherwise personalized by and for the seller. Such a virtual store may also offer promotions, incentives and features that are specific and personalized to a relevant seller.

Navigation of the online marketplace may be facilitated by one or more navigation application(s) 220. For example, a search application (as an example of a navigation application) may enable key word searches of listings published via the network-based publisher 102. A browse application may allow users to browse various category, catalogue, or inventory data structures according to which listings may be classified within the network-based publisher 102. Various other navigation applications may be provided to supplement the search and browsing applications.

Merchandizing application(s) 222 support various merchandising functions that are made available to sellers to enable sellers to increase sales via the network-based publisher 102. The merchandizing application(s) 222 also operate the various merchandising features that may be invoked by sellers, and may monitor and track the success of merchandising strategies employed by sellers.

Personalization application(s) 230 allow users of the network-based publisher 102 to personalize various aspects of their interactions with the network-based publisher 102. For example, a user may, utilizing an appropriate personalization application 230, create a personalized reference page at which information regarding transactions to which the user may be (or has been) a party may be viewed. Further, the personalization application(s) 230 may enable a third party to personalize products and other aspects of their interactions with the network-based publisher 102 and other parties, or to provide other information, such as relevant business information about themselves.

The publication system 120 may include one or more internationalization application(s) 232. In one example embodiment, the network-based publisher 102 may support a number of marketplaces that are customized, for example, for specific geographic regions. A version of the network-based publisher 102 may be customized for the United Kingdom, whereas another version of the network-based publisher 102 may be customized for the United States. Each of these versions may operate as an independent marketplace, or may be customized (or internationalized) presentations of a common underlying marketplace. The network-based publisher 102 may accordingly include a number of internationalization application(s) 232 that customize information (and/or the presentation of information) by the network-based publisher 102 according to predetermined criteria (e.g., geographic, demographic or marketplace criteria). For example, the internationalization application(s) 232 may be used to support the customization of information for a number of regional websites that are operated by the network-based publisher 102 and that are accessible via respective web servers.

Reputation application(s) 234 allow users that transact, utilizing the network-based publisher 102, to establish, build and maintain reputations, which may be made available and published to potential trading partners. Consider that where, for example, the network-based publisher 102 supports person-to-person trading, users may otherwise have no history or other reference information whereby the trustworthiness and credibility of potential trading partners may be assessed. The reputation application(s) 234 allow a user, for example through feedback provided by other transaction partners, to establish a reputation within the network-based publisher 102 over time. Other potential trading partners may then reference such a reputation for the purposes of assessing credibility and trustworthiness.

In order to make listings, available via the network-based publisher 102, as visually informing and attractive as possible, the publication system 120 may include one or more imaging application(s) 236 utilizing which users may upload images for inclusion within listings. An imaging application 236 also operates to incorporate images within viewed listings. The imaging application(s) 236 may also support one or more promotional features, such as image galleries that are presented to potential buyers. For example, sellers may generally pay an additional fee to have an image included within a gallery of images for promoted items.

The publication system 120 may include one or more offer creation application(s) 238. The offer creation application(s) 238 allow sellers conveniently to author products pertaining to goods or services that they wish to transact via the network-based publisher 102. Offer management application(s) 240 allow sellers to manage offers, such as goods, services, or donation opportunities. Specifically, where a particular seller has authored and/or published a large number of products, the management of such products may present a challenge. The offer management application(s) 240 provide a number of features (e.g., auto-reproduct, inventory level monitors, etc.) to assist the seller in managing such products. One or more post-offer management application(s) 242 also assist sellers with a number of activities that typically occur post-offer. For example, upon completion of an auction facilitated by one or more auction application(s) 212, a seller may wish to leave feedback regarding a particular buyer. To this end, a post-offer management application 242 may provide an interface to one or more reputation application(s) 234, so as to allow the seller conveniently to provide feedback regarding multiple buyers to the reputation application(s) 234.

The dispute resolution application(s) 246 may provide mechanisms whereby disputes arising between transacting parties may be resolved. For example, the dispute resolution application(s) 246 may provide guided procedures whereby the parties are guided through a number of steps in an attempt to settle a dispute. In the event that the dispute cannot be settled via the guided procedures, the dispute may be escalated to a mediator or arbitrator.

The fraud prevention application(s) 248 may implement various fraud detection and prevention mechanisms to reduce the occurrence of fraud within the network-based publisher 102. The fraud prevention application(s) may prevent fraud with respect to the third party and/or the client user in relation to any part of the request, payment, information flows and/or request fulfillment. Fraud may occur with respect to unauthorized use of financial instruments, non-delivery of goods, and abuse of personal information.

Authentication application(s) 250 may verify the identity of a user, and may be used in conjunction with the fraud prevention application(s) 248. The user may be requested to submit verification of identity, an identifier upon making the purchase request, for example. Verification may be made by a code entered by the user, a cookie retrieved from the device, a phone number/identification pair, a username/ password pair, handwriting, and/or biometric methods, such as voice data, face data, iris data, finger print data, and hand data. In some embodiments, the user may not be permitted to login without appropriate authentication. The system (e.g., the FSP) may automatically recognize the user, based upon the particular network-based device used and a retrieved cookie, for example.

The network-based publisher 102 itself, or one or more parties that transact via the network-based publisher 102, may operate loyalty programs and other types of promotions that are supported by one or more loyalty/promotions application(s) 254. For example, a buyer/client user may earn loyalty or promotions points for each transaction established and/or concluded with a particular seller/third party, and may be offered a reward for which accumulated loyalty points can be redeemed.

The application server(s) 118 may include messaging application(s) 256. The messaging application(s) 256 are responsible for the generation and delivery of messages to client users and third parties of the network-based publisher 102. Information in these messages may be pertinent to services offered by, and activities performed via, the payment system 120. Such messages, for example, advise client users regarding the status of products (e.g., providing "out of stock" or "outbid" notices to client users) or payment status (e.g., providing invoice for payment, Notification of a Payment Received, delivery status, invoice notices). Third parties may be notified of a product order, payment confirmation and/or shipment information. Respective messaging application(s) 256 may utilize any one of a number of message delivery networks and platforms to deliver messages to users. For example, messaging application(s) 256 may deliver electronic mail (email), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

The payment system 120 may include one or more payment processing application(s) 258. The payment processing application(s) 258 may receive electronic invoices from the merchants and may receive payments associated with the electronic invoices. The payment system 120 may also make use of functions performed by some applications included in the publication system 120.

The publication system 120 may include one or more plain text listing applications 260. The one or more plain text listing applications may receive a plain text email from a user that includes sales information for an item the user wishes to list on the publication system, and has with a picture of the item attached. The email may be in the user's words and in the user's language. The one or more plain text listing applications may receive the email, parse the plain text of the email, compose a view item page ("VIP") for the item listing, and send the VIP to the listing party for review. The listing party may then confirm what the one or more plain text listing applications has created as a view item page. When the user confirms the view item page the listing goes live on the publication system.

Figure 3:
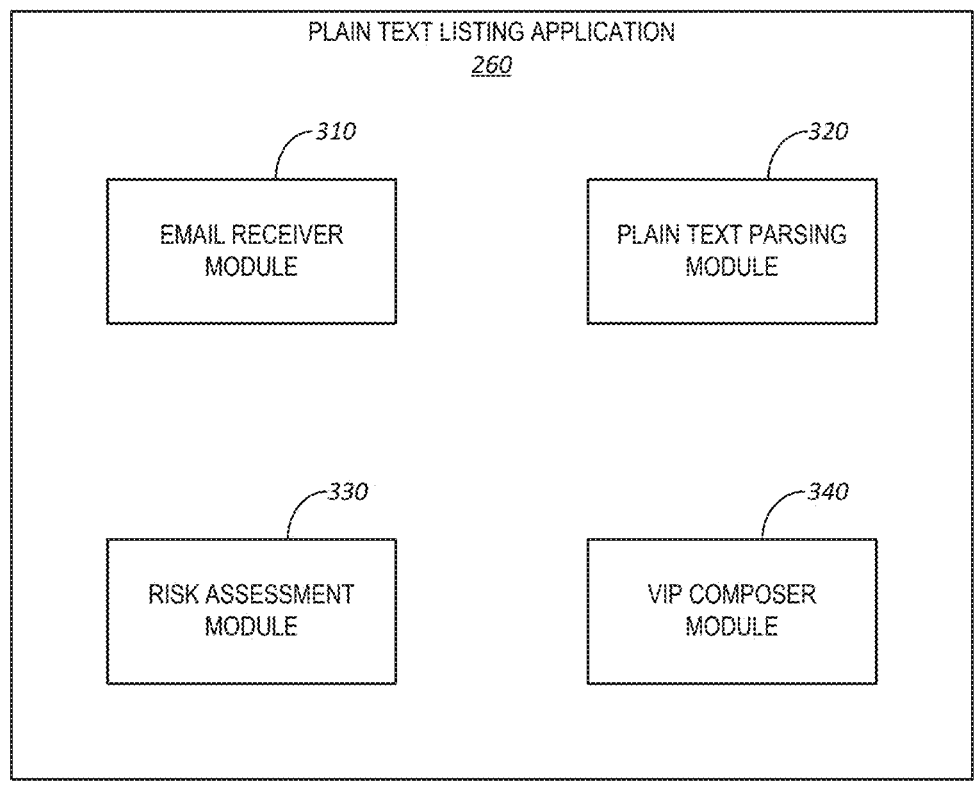
FIG. 3 is a block diagram of a plain text listing application in accordance with an example embodiment.

Referring now to FIG. 3, an example block diagram of a plain text listing application is illustrated according to an example embodiment. Plain text listing application 260 may comprise an email receiver module 310, a plain text parsing module 320, a risk assessment module 330, and a VIP composer module. As discussed in more detail below, a user wishing to list an item on the publication system may send the system an email in plain text that indicates the title of the item, the price for sale of the item, and a description of the item. The parsing module 320 may also extract from information in the email a listing category for the item, as well as item attributes. The email may be received by the email receiver module 310. The plain text parsing module 320, using well known parsing technology, may then parse the email to determine the title of the item, the price for sale of the item, and a description of the item. If desired, the risk assessment module 330 may undertake a risk assessment of the email, perhaps using a commercially available risk management service. If there is low risk in dealing with the email, and if the plain text parsing module 320 determines sufficient data to list the item, a view item page (VIP) for the item may be composed by VIP composer module. The VIP may be privately viewable and also editable, by the user. The VIP composer module may have functionality to send the composed VIP to the user, who may either confirm that it is an appropriate listing for the item, or may edit information in the composed VIP and return it via the email receiver module 310. Once confirmed the VIP composer module may send the VIP to go live on the system. The user may be notified by email or otherwise that the VIP is going live.

Figure 4:
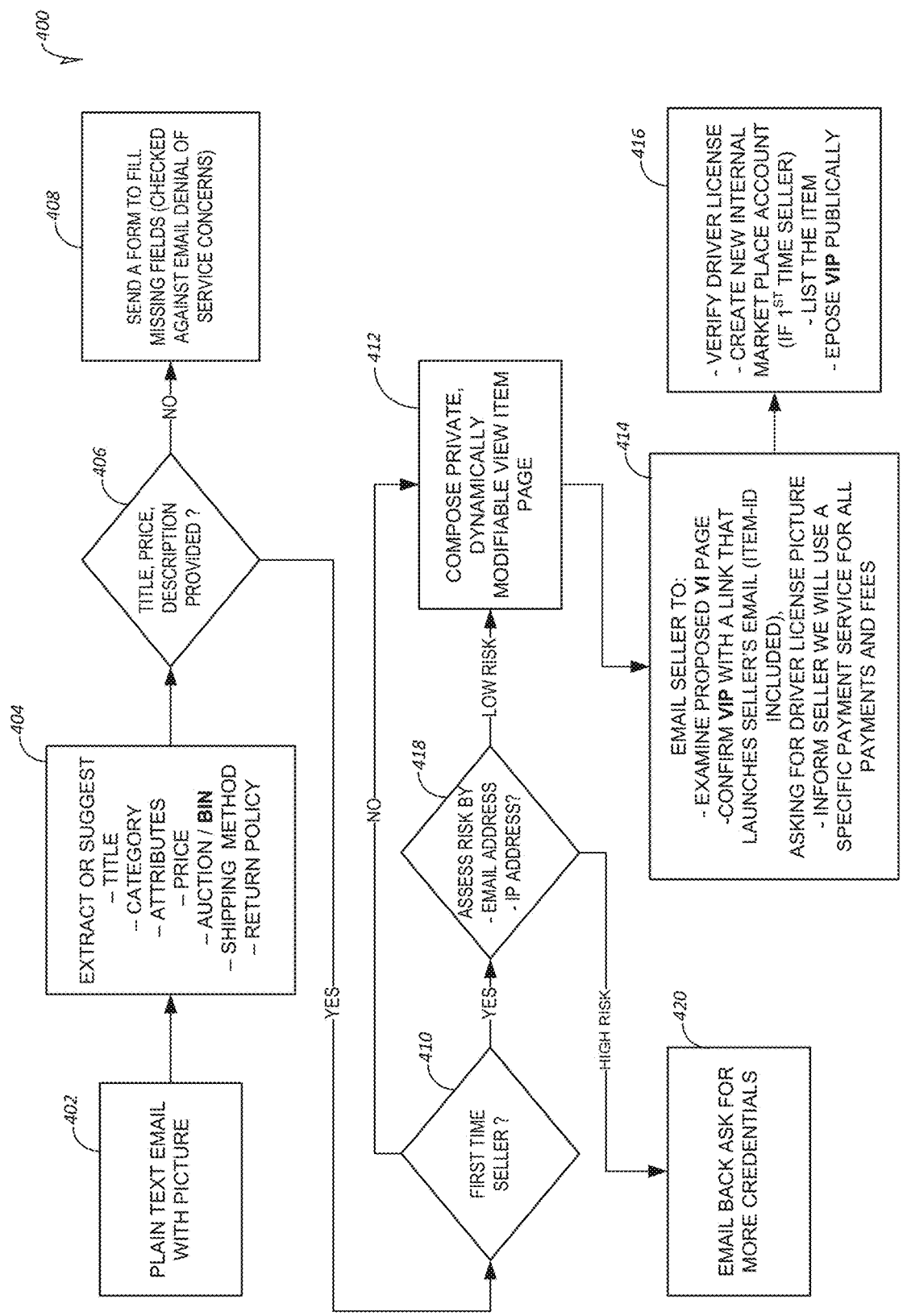
FIG. 4 is a flowchart of a work flow in accordance with an example embodiment.

FIG. 4 is a flowchart of a work flow in accordance with an example embodiment. As shown in FIG. 4, the method 400 commences at operation 402, with a seller who wishes to list an item composing a plain text email with a picture of the item. The seller may send the email to the ecommerce system where it may be received by the plain text listing application 260 of FIG. 2. In this context plain text may be viewed as meaning the seller's own words in the seller's language. As seen at 404, the email receiver module 310 of FIG. 3 may receive the email and plain text parsing module 320 of FIG. 3 may parse the email using well known parsing technologies and attempts to extract at least the title, item category and item attributes from the email language.

Categorization is well known and need not be described in detail here. One of many examples of categorization may be found in U.S. Pat. No. 7,870,031 issued Jan. 11, 2011 entitled, "Suggested Item Category Systems and Methods" and assigned to the assignee of the present application, which is incorporated herein by reference in its entirety.

An attribute is a feature associated with a selected item that operates to include the selected item as a member of a particular set or group. For example, considering a particular category, such as the "shoes" category, one attribute might be color, another attribute might be size, another attribute might be brand, and so forth. As another example, in the category of "jewelry," attributes might include, but not be limited to: stone type, cut, quality, and setting. As is the case with categories, myriad variations are possible. Generally, attributes for a classification may be determined as set forth in U.S. Pat. No. 7,870,031.

The plain text parsing module 320 of FIG. 3 may identify the price the seller is listing the item for. This may be done by, in one example embodiment, searching the string of text in the email for a dollar sign ($) (for countries whose currency is denoted in dollars), and parsing the text following the dollar sign to determine the price. Other methods may be used.

Also determined from the email or from historical experience data stored within the ecommerce system, would be whether the item may be offered at auction (sometimes preferable for certain items such as collectables for which a price may not be easily determined) or as a fixed price, Buy It Now (BIN) item (sometimes preferable for items for which a price may be more easily determined). In addition, the payment service to be used, the shipping method and the return policy may also be set as a condition or determined by the ecommerce system.

At operation 406 in the parsing process, a determination may be made from the email whether at least title, price and description of the item have been provided. If a NO decision is taken, operation 408 sends the seller a communication such as an email (after checking the seller's email against denial of service concerns if desired) that may include a form asking the seller to fill in the missing fields. For example, if a description was determined not to have been provided at operation 406, the form will request the description from the seller. If, however, a YES decision is determined at operation 406 then the ecommerce system will extract title, price, description and other relevant information about the seller's item from the email and proceed to operation 410.

At operation 410, if desired, a determination may be made whether the seller is a first time seller on the ecommerce system. This determination may be made by comparing the seller's identity against historical seller records in the ecommerce system. If a YES determination is made, this email may be a more risky situation than if the seller had previously sold items on the ecommerce system because then the ecommerce system may have reputation information against which to assess the risk of dealing with the seller. The ecommerce system may therefore determine the risk of dealing with the seller by the email address and the IP address of the email. As mentioned above, risk determination may be obtained commercially by the ecommerce system from businesses that determine such risk. If a determination of High Risk is made, that may mean that the email may be part of a denial of service or other negative action. The ecommerce system may then request additional credentials that may be evaluated and a decision may be made to proceed with the listing or to abandon the listing.

If the email is determined to be of Low Risk, then at operation 412 where the ecommerce system may compose a proposed view item page by the VIP composer module 340 of FIG. 3. The VIP may be privately viewable and/or modifiable by the seller. An email may be sent to the seller as at 414 asking the seller to examine or review the proposed VIP and if there are errors, correct them, and if there are no errors, confirm the VIP. If the seller agrees with the VIP, then he or she may confirm the VIP by email. If the seller detects an error or is otherwise dissatisfied with the VIP, then the seller may edit information in the composed VIP and return it via the email receiver module 310 of FIG. 3.

The seller's identity may be confirmed at 414 by requesting the seller's driver's license, including photo ID. Other identity verification may be used such as, in one example, by sending a captcha phrase and asking for its return, as by the seller re-entering the captcha phrase, for verification purposes. The ecommerce system may here list the conditions for selling the item. As one example, if the ecommerce system also operates a payment service, the seller may be informed that that specific payment service will be used exclusively for payment for sale of the item. One intended characteristic of the operations of the method 400 is to get the information completed and back quickly to the seller, perhaps within thirty seconds, to guard against losing the interest of the seller.

At operation 416 the ecommerce system may verify the driver's license or other identification information and create an internal market place ("MP") account for the seller if the seller is a first time seller. This may be a temporary MP account internal to the ecommerce system or payment service and may be automatically set up without further input from the seller. The ecommerce system may then list the item and expose the VIP to public view so that a search may find it and a buyer may purchase the item.

In one example embodiment, after the item is sold the seller who is a first time seller for whom a temporary MP account was created may then be made a registered seller. The seller registration process may involve the seller providing additional information. If this step is postponed until after the item is sold instead of before the item is sold, the seller is more likely to complete the registration process knowing that the item has been sold and the seller will be compensated. If the registration process takes place before the item is sold the seller may lose interest because of the amount of information that may need to be inputted by the seller.

Figure 5:
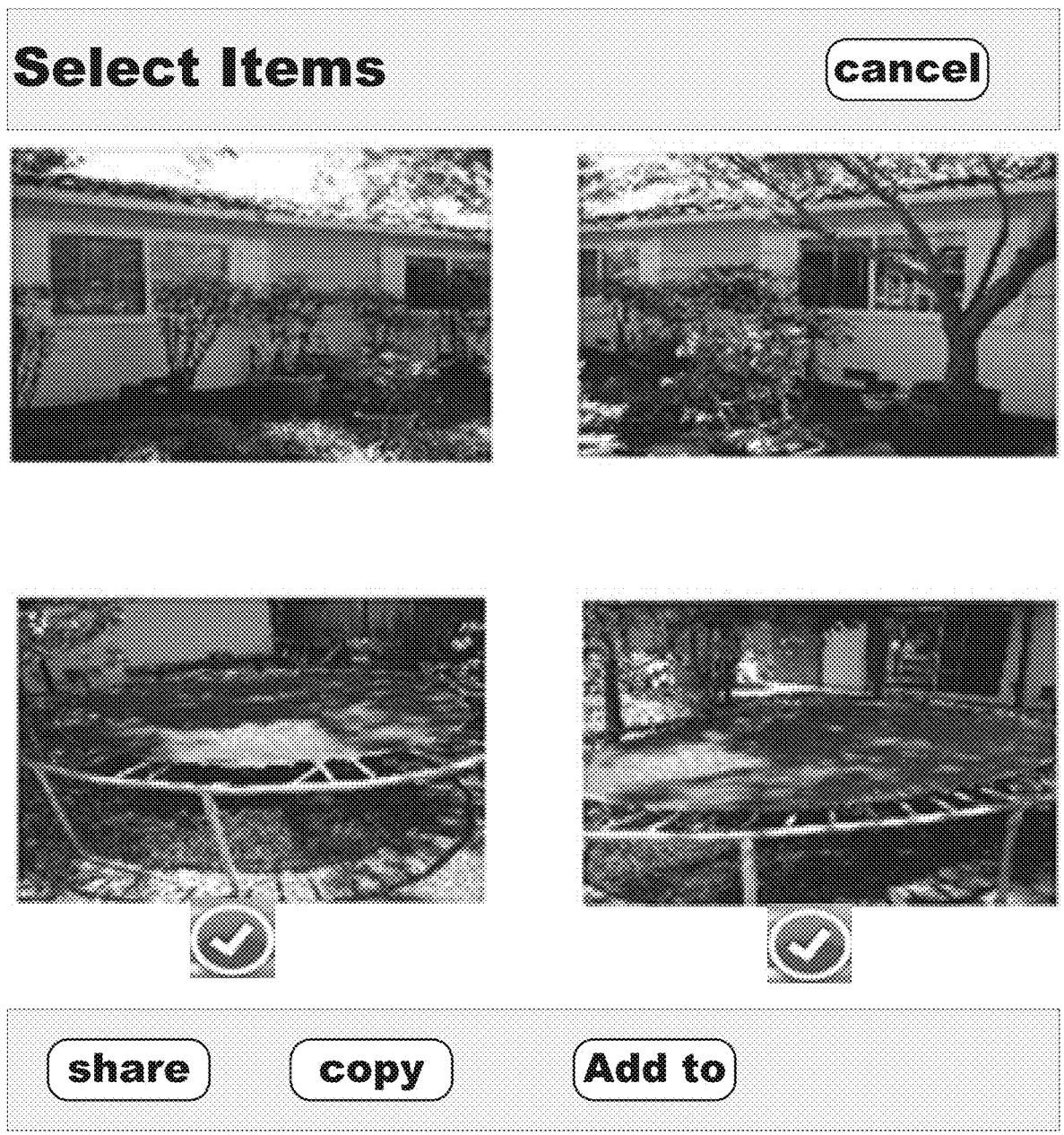
FIG. 5 illustrates an example of two pictures of an item that a user wishes to list for publication, and has taken on a smartphone in accordance with an example embodiment.
Figure 6:
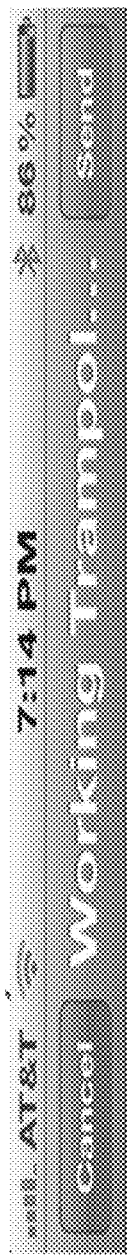
FIG. 6 illustrates an email the user may compose via a smartphone in accordance with an example embodiment.
Figure 6:
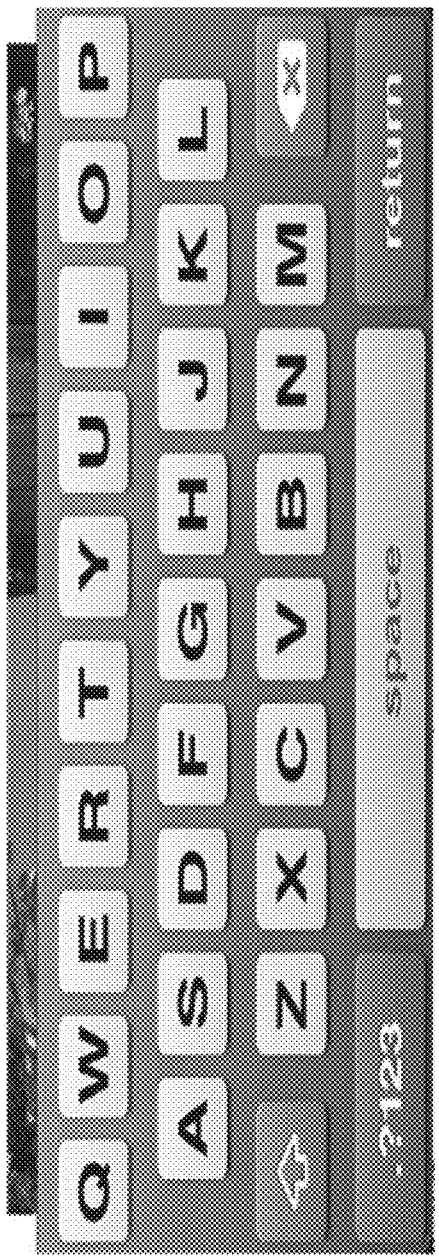
Figure 7:
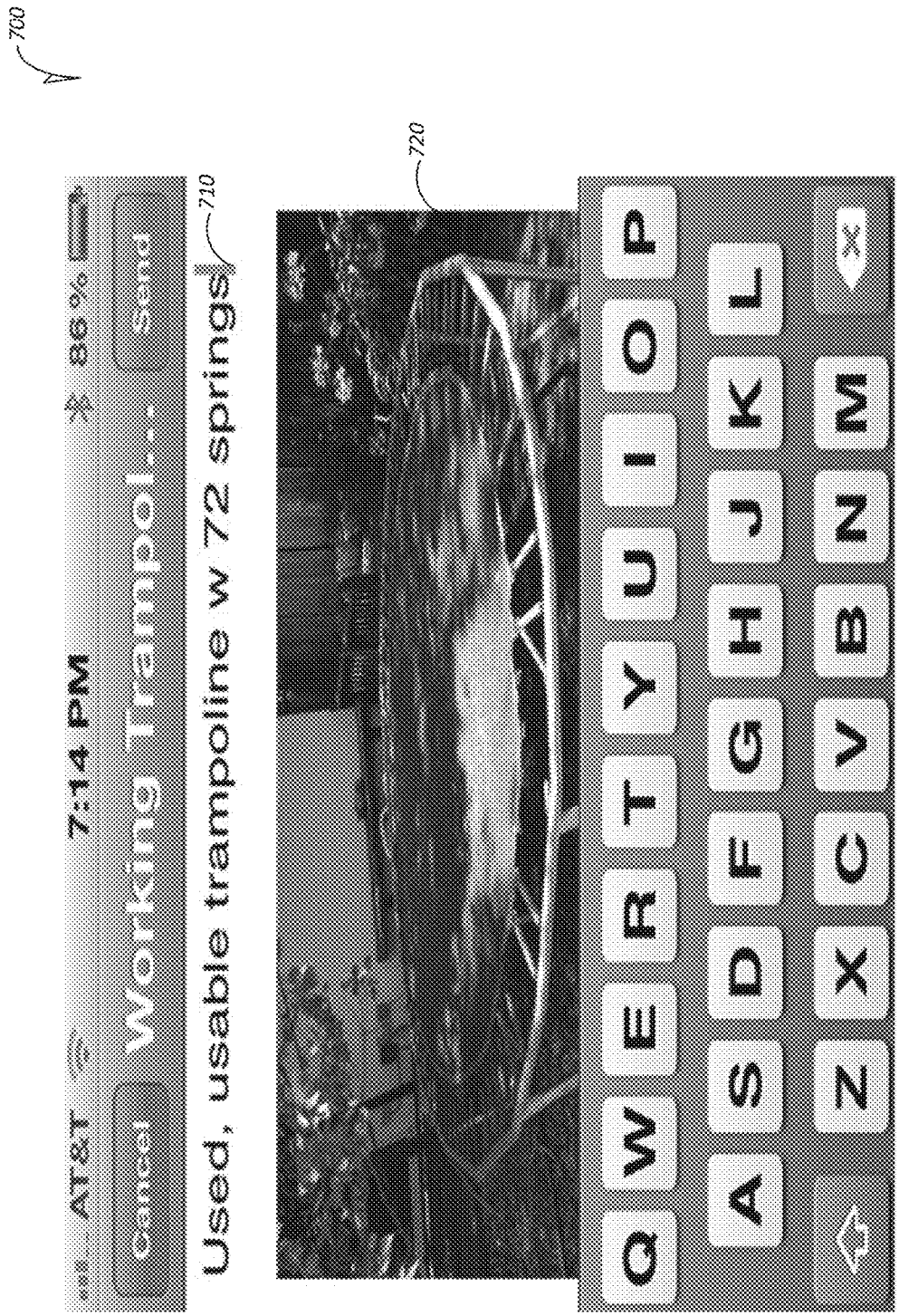
FIG. 7 illustrates the email of FIG. 6 scrolled down so that attached picture is visible.

The pictures of the item to be sold may be taken by a smart phone or other photo-taking device. FIG. 5 shows an example of two pictures of an item that the seller wishes to sell, and has taken on a smartphone. FIG. 6 illustrates the email the seller may compose via the smartphone. A photograph of the trampoline 720 of FIG. 7 may be attached to the email of FIG. 6. In that figure, the subject provides the title and description of the item at 620, as Working Trampoline 14x10 used. The body of the email states that the trampoline is used, is usable, and has 72 springs ("w 72 springs") as at 630. In this instance the email has the name of the item (trampoline), its description, (used, usable trampoline w 72 springs). While a particular layout of the email is illustrated in FIG. 6, those of ordinary skill in the art will appreciate that the foregoing information could be placed elsewhere in the email. FIG. 7 shows the email of FIG. 6 scrolled down so that attached photograph of the trampoline is visible.

Figure 8:
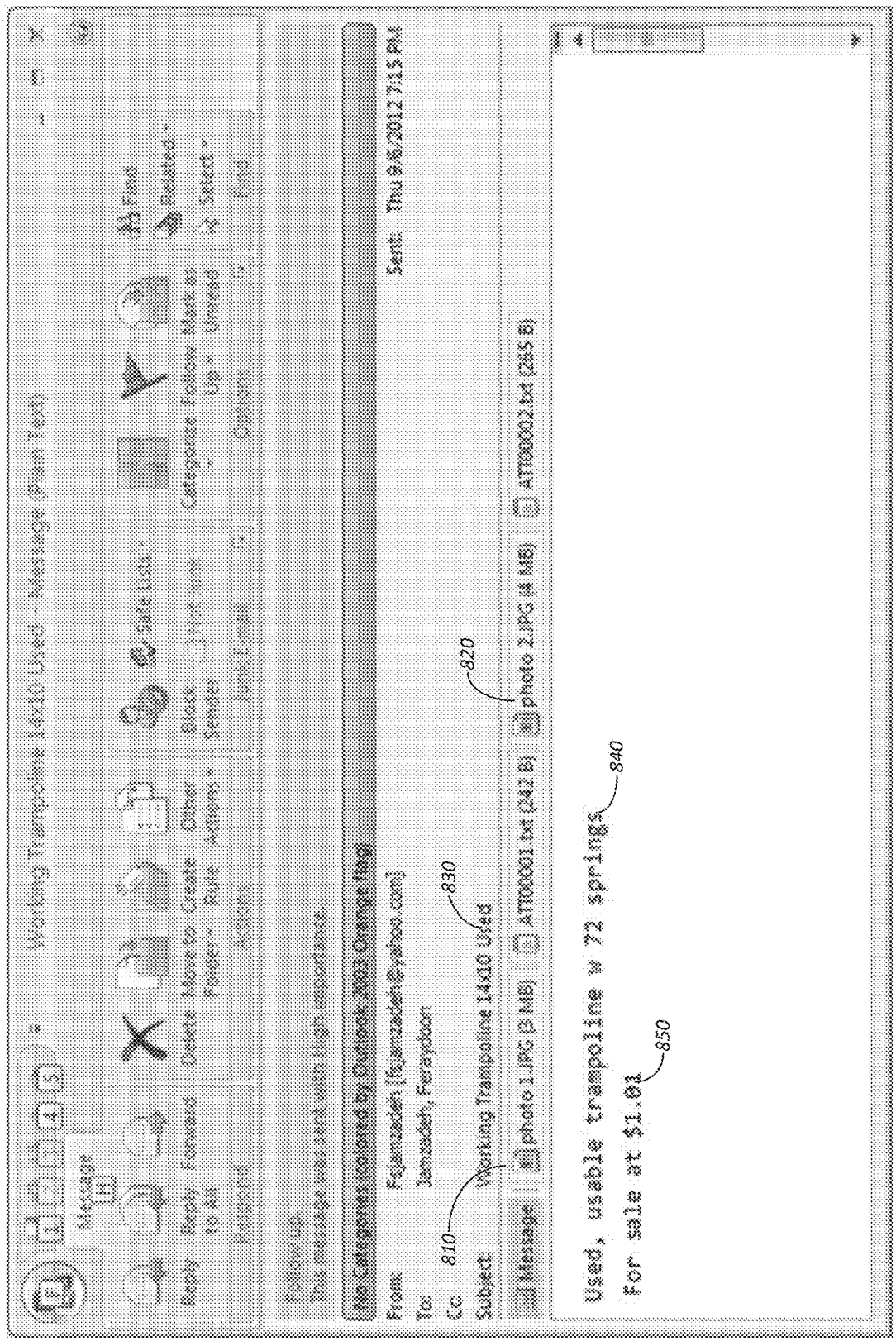
FIG. 8 illustrates the email of FIGS. 6 and 8 that the publication system may receive from the user in accordance with an example embodiment.

FIG. 8 illustrates the email that the ecommerce system may receive from the seller. The seller has addressed the email to the appropriate ecommerce listing department, here fjamzadeh@ebay.com. FIG. 8 illustrates the email with the photos attached at 810, 820. In this case the two photos of FIG. 5 are attached as JPG files, the subject line describes title of the item as a Trampoline, and gives the additional information Working Trampoline 14x10 used, as seen at 830. The body of the email gives the information Used, usable trampoline w 72 springs as at 840. The price is given here $1.01 at 850 for illustrative purposes only. This data may then be parsed by plain text parsing module 320 for the purposes described herein.

While a trampoline has been used as an example for the item to be listed, those or ordinary skill in the art will recognize that the item could be any item. In particular, the item might be a well-known item, e.g. iPhone 4-S with 16 GB memory, or Levi's black 505 jeans size 32-32. In this type of situation, the email of FIG. 8 from the seller may contain the item bar code, UPC, ISBN, or other identifier. This could be in the body of the email itself, or it could be in the picture(s) attached to the email. In this case, the system may not need to parse and process the email for item category, title, or description. The bar code, UPC, ISBN or other similar identifier may be decoded to obtain that information using well known decoding technology.

Figure 9:
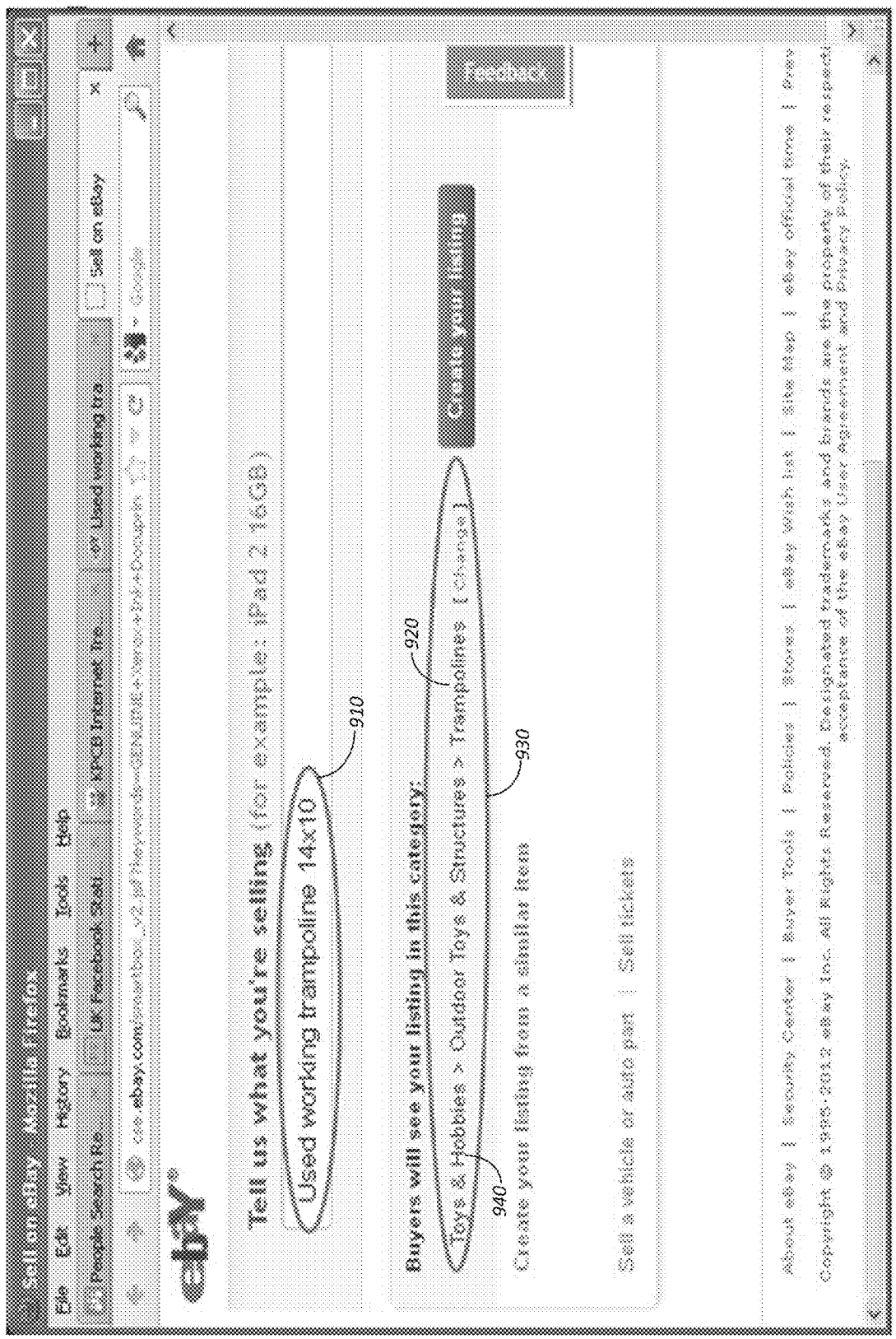
FIG. 9 illustrates certain details on a parsing function in accordance with an example embodiment.

FIG. 9 provides additional details on the parsing function discussed above. In one example embodiment the parsing module may parse the subject of the email which, in the current example, is "used working trampoline 144x10" at 910. The subject line may be fed into a categorizer of the type set forth in the above U.S. Pat. No. 7,870,031 to determine both a category and attributes. In this case the service comes back with "Trampoline" 920 as a category, which is under "Outdoor Toys & Structures" 930 which, in turn, is under "Toys and Hobbies" 940. Other types of information can be extracted, such as attributes, price, auction or fixed price (BIN), shipping method and return policy. Some of the information may be a default value. For example, the return policy may be a default, set policy.

Figure 10:
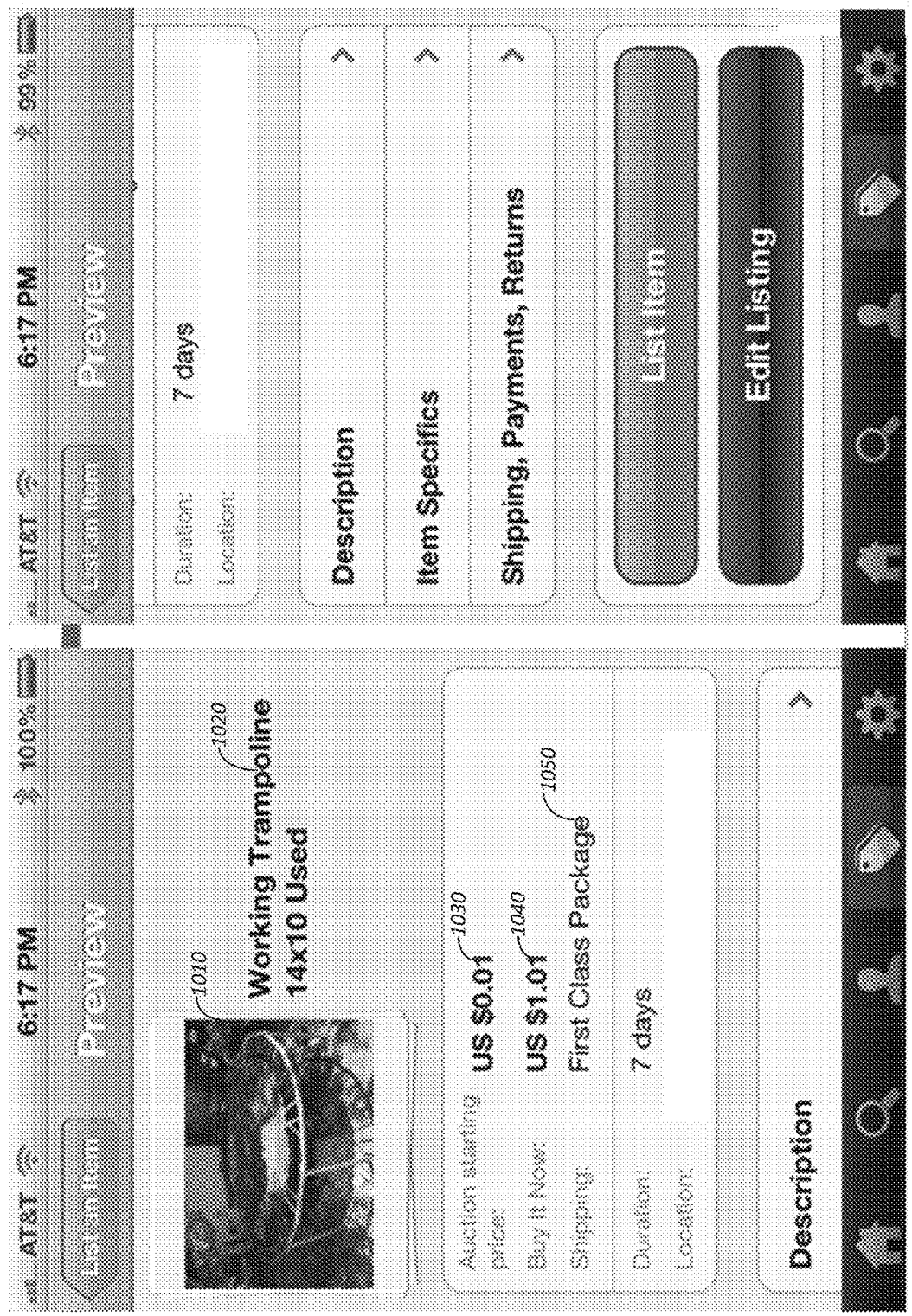
FIG. 10 is an illustration of a composition of a proposed view item page in accordance with an embodiment.
Figure 11:
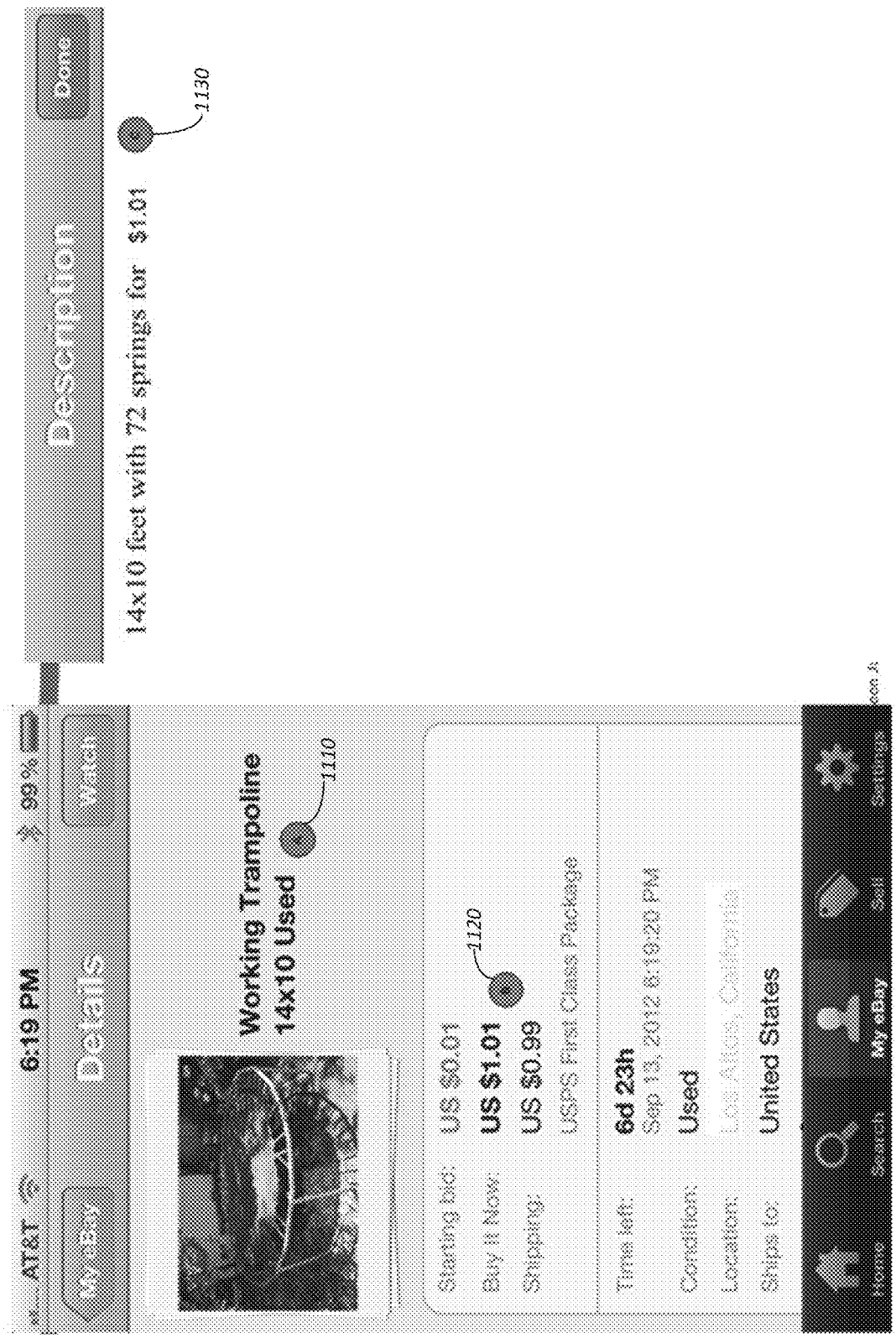
FIG. 11 is another illustration of a composition of a proposed view item page, showing items to be confirmed or edited in accordance with an embodiment.

FIG. 10 is an illustration of a composition of a proposed view item page that has the photo of the trampoline 1010, the title and description 1020, the auction price 1030, the fixed price (or Buy It Now (BIN) price) 1040, and the shipping information 1050, among others. As mentioned above, this VIP may be privately viewable by the seller and/or editable by the seller. This is seen in FIG. 11 where the title and description A at 1110, the starting bid for an auction sale and the Buy It Now price B at 1120, and additional detailed description C at 1130. The seller may be asked to confirm the VIP and send it back to the ecommerce system. The seller may at this point edit any of the foregoing items of information and send the edited VIP back to the ecommerce system. Additional conditions may be provided by the ecommerce system such as use of a particular payment service. Before actually going live, the seller may be asked at this point for identification such as a driver's license. The driver license information may be verified and an internal, temporary seller account may be created for the seller with, if desired, no further work needing to be done by the seller. The item may then be displayed live and the seller may be so informed.

Figure 12:
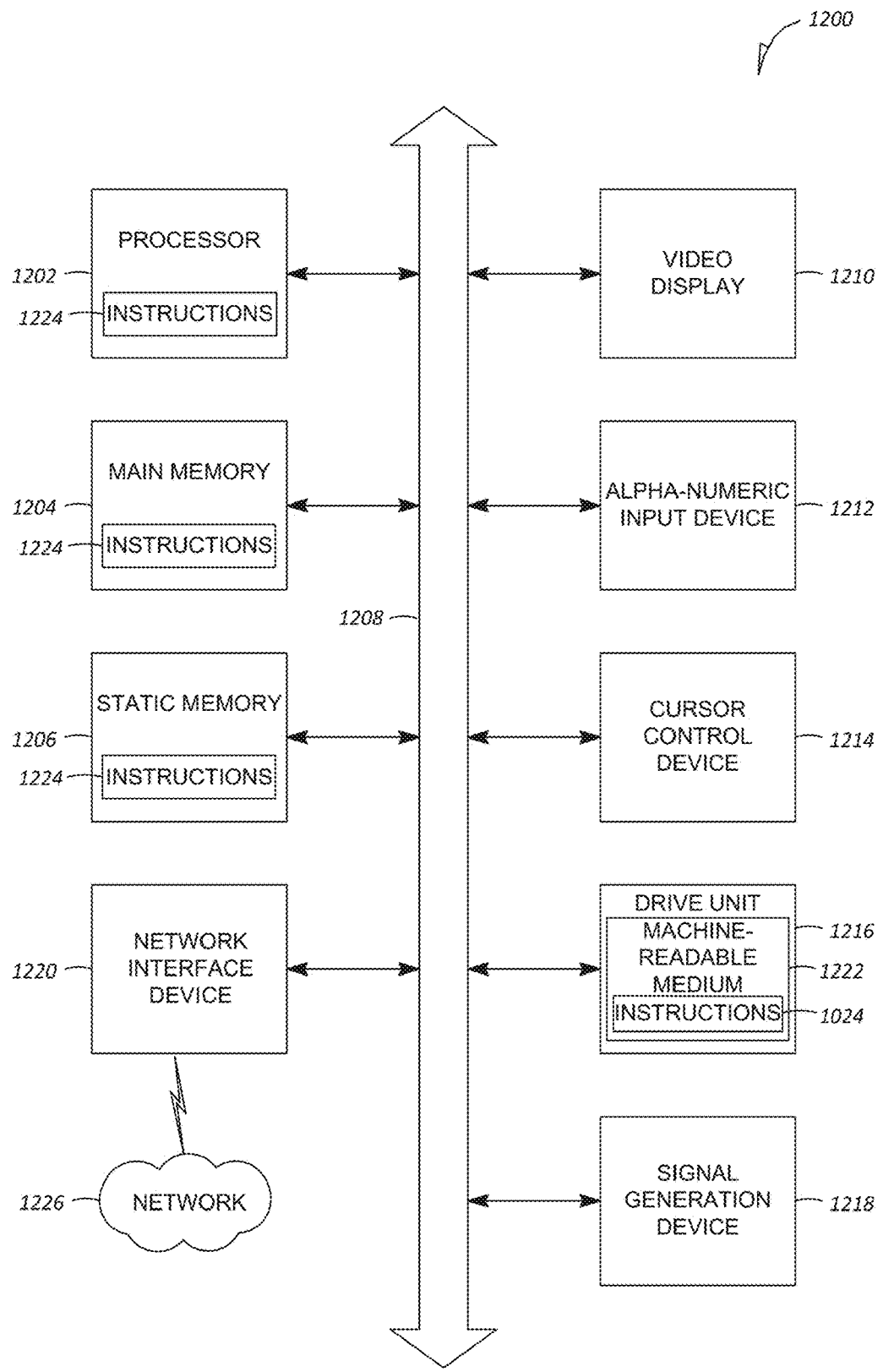
FIG. 12 is a diagrammatic representation of an example machine in the form of a computer system within which a set of instructions, for causing the machine to perform any one or more of the methodologies discussed herein, may be executed.

FIG. 12 is a diagrammatic representation of a machine in the example form of a computer system 1200 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1206. The computer system 1200 may further include a video display unit 1210 (e.g., a liquid crystal display (LCD) or a cathode ray tube (CRT)). The computer system 1200 also includes an alpha-numeric input device 1212 (e.g., a keyboard), a user interface (UI) navigation device 1214 (e.g., a cursor control device), a disk drive unit 1216, a signal generation device 1218 (e.g., a speaker) and a network interface device 1220.

The disk drive unit 1216 includes a machine-readable medium 1222 on which is stored one or more sets of instructions and data structures (e.g., software 1224) embodying or utilized by any one or more of the methodologies or functions described herein. The software 1224 may also reside, completely or at least partially, within the main memory 1204 and/or within the processor 1202 during execution thereof by the computer system 1200, with the main memory 1204 and the processor 1202 also constituting machine-readable media.

The software 1224 may further be transmitted or received over a network 1226 via the network interface device 1220 utilizing any one of a number of well-known transfer protocols (e.g., Hyper Text Transfer Protocol (HTTP)).

While the machine-readable medium 1222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, method and system to provide a scroll map have been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A computer implemented method for automatically creating a listing in a listing service and preventing a denial of service attack, the method comprising:
receiving, from a client machine, via an email receiver module operating on one or more computer systems, an email comprising an email address;
determining to generate a listing in the listing service based on the email;
passing the email to a plain text parsing module operating on the one or more computer systems;
parsing, at the plain text parsing module, the email comprising the email address;
passing the email comprising the email address to a risk assessment module operating on the one or more computer systems;
determining, at the risk assessment module, based on the email address, that the email is high risk; and
based on the determination that the email is high risk:
determining, based on parsing the email, that the email is missing data for one or more fields for the listing;
determining to withhold sending a form to the client machine requesting the missing data for the one or more fields for the listing;
requesting additional credentials regarding a user identity from the client machine;
receiving the additional credentials from the client machine;
evaluating the additional credentials by verifying the additional credentials, the additional credentials comprising a code, a cookie of the client machine, a username and password pair, biometric data, or any combination thereof;
in response to the evaluation, permitting the listing to be created; and
automatically generating, by a view item page composer module operating on the one or more computer systems, the listing in the listing service using the email.

2. The method of claim 1, wherein the email further comprises an Internet Protocol (IP) address and the determining that the email is high risk is also based on the IP address.

3. The method of claim 1, wherein the email further contains an identification of an item, a category for the item, one or more attributes for the item, and one or more digital images, and the automatically generating uses the identification, category, one or more attributes, and one or more digital images to generate the listing.

4. The method of claim 1, further comprising creating a temporary account that is privately viewable, using no user information other than information from the email.

5. The method of claim 4, wherein when a listed item associated with the listing is sold, the method further comprises detecting that the listed item is sold and, responsive to detecting that the listed item is sold, registering a user associated with the user identity and the client machine as a member of an online system.

6. The method of claim 1, further comprising forwarding the generated listing to the client machine for confirmation or modification.

7. The method of claim 1, further comprising determining, from plain text information in the email, a format for the listing.

8. A computer-readable hardware storage device having stored therein a set of instructions which, when executed by one or more processors of a computer, causes the computer to execute operations comprising:
   receive, from a client machine, via an email receiver module operating on the computer, an email comprising an email address;
   determine to generate a listing in a listing service based on the email;
   pass the email to a plain text parsing module operating on the computer;
   parse, at the plain text parsing module, the email comprising the email address;
   pass the email comprising the email address to a risk assessment module operating on the computer;
   determine, at the risk assessment module, based on the email address, that the email is high risk; and
   based on the determination that the email is high risk:
      determine, based on parsing the email, that the email is missing data for one or more fields for the listing;
      determine to withhold sending a form to the client machine requesting the missing data for the one or more fields for the listing;
      request additional credentials regarding a user identity from the client machine;
      receive the additional credentials from the client machine;
      evaluate the additional credentials by verifying the additional credentials, the additional credentials comprising a code, a cookie of the client machine, a username and password pair, biometric data, or any combination thereof;
      in response to the evaluation, permit the listing to be created; and
      automatically generate, by a view item page composer module operating on the computer, the listing in the listing service using the email.

9. The computer-readable hardware storage device of claim 8, wherein the email further comprises an Internet Protocol (IP) address and the determining that the email is high risk is also based on the IP address.

10. The computer-readable hardware storage device of claim 9, wherein the email further contains an identification of an item, a category for the item, one or more attributes for the item, and one or more digital images, and the automatically generating uses the identification, category, one or more attributes, and one or more digital images to generate the listing.

11. The computer-readable hardware storage device of claim 8, wherein the instructions further cause the computer to execute operations comprising creating a temporary account that is privately viewable, using no user information other than information from the email.

12. The computer-readable hardware storage device of claim 11, wherein when a listed item associated with the listing is sold, the instructions further cause the computer to execute operations comprising detecting that the listed item is sold and, responsive to detecting that the listed item is sold, registering a user associated with the user identity and the client machine as a member of an online system.

13. The computer-readable hardware storage device of claim 11, wherein the instructions further cause the computer to execute operations comprising forwarding the generated listing to the client machine for confirmation or modification.

14. The computer-readable hardware storage device of claim 11, wherein the instructions further cause the computer to execute operations comprising determining, from plain text information in the email, a format for the listing.

15. An online system for automatically listing an item for sale, the online system comprising:
   one or more computer processors; and
   a memory storing instructions executable by the one or more computer processors to cause the online system to:
      receive, from a client machine, via an email receiver module operating on the online system, an email comprising an email address;
      determine to generate a listing in a listing service based on the email;
      pass the email to a plain text parsing module operating on the online system;
      parse, at the plain text parsing module, the email comprising the email address;
      pass the email comprising the email address to a risk assessment module operating on the online system;
      determine, at the risk assessment module, based on the email address, that the email is high risk; and
      based on the determination that the email is high risk:
         determining, based on parsing the email, that the email is missing data for one or more fields for the listing;
         determine to withhold sending a form to the client machine requesting the missing data for the one or more fields for the listing;
         request additional credentials regarding a user identity from the client machine;
         receive the additional credentials from the client machine;
         evaluate the additional credentials by verifying the additional credentials, the additional credentials comprising a code, a cookie of the client machine, a username and password pair, biometric data, or any combination thereof;
         in response to the evaluation, permit the listing to be created; and
         automatically generate, by a view item page composer module operating on the online system, the listing in the listing service using the email.

16. The online system of claim 15, wherein the email further comprises an Internet Protocol (IP) address and the determining that the email is high risk is also based on the IP address.

17. The online system of claim 16, wherein the email further contains an identification of an item, a category for the item, one or more attributes for the item, and one or more digital images, and the automatically generating uses the identification, category, one or more attributes, and one or more digital images to generate the listing.

18. The online system of claim 15, wherein the instructions further cause the online system to create a temporary account that is privately viewable, using no user information other than information from the email.

19. The online system of claim 15, wherein when a listed item associated with the listing is sold, the instructions further cause the online system to detect that the listed item is sold and, responsive to detecting that the listed item is sold, registering a user associated with the user identity and the client machine as a member of the online system.

20. The online system of claim 15, wherein the instructions further cause the online system to forward the generated listing to the client machine for confirmation or modification.

* * * * *